Nov. 3, 1959   D. L. JAFFE ET AL   2,911,564
MULTI-PULSE SPECTRUM ANALYZER APPARATUS
Filed April 13, 1956   4 Sheets-Sheet 1

D. L. JAFFE & A. ROSS
INVENTORS

BY Darby & Darby
ATT'YS

Nov. 3, 1959

D. L. JAFFE ET AL 2,911,564

MULTI-PULSE SPECTRUM ANALYZER APPARATUS

Filed April 13, 1956

D. L. JAFFE & A. ROSS
INVENTORS

BY Darby & Darby
ATT'YS

Nov. 3, 1959  D. L. JAFFE ET AL  2,911,564
MULTI-PULSE SPECTRUM ANALYZER APPARATUS
Filed April 13, 1956  4 Sheets-Sheet 4
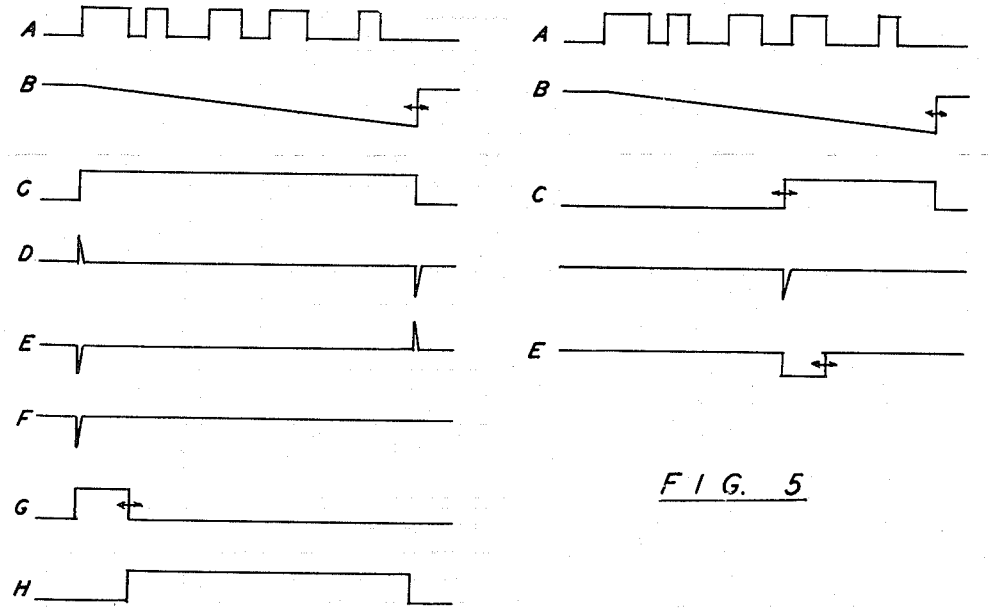
FIG. 3
FIG. 5
FIG. 4  FIG. 6
D. L. JAFFE & A. ROSS
INVENTORS
BY Darby & Darby
ATT'YS

United States Patent Office 2,911,564
Patented Nov. 3, 1959

2,911,564

MULTI-PULSE SPECTRUM ANALYZER APPARATUS

David Lawrence Jaffe, Great Neck, and Allan Ross, Brooklyn, N.Y., assignors to Polarad Electronics Corporation, Long Island City, N.Y., a corporation of New York Application April 13, 1956, Serial No. 578,113

16 Claims. (Cl. 315—22)

The present invention is concerned with apparatus for indicating the frequency spectrum of electric waveforms and is more particularly concerned with improvements in and accessories for spectrum analyzers adapted to select for analysis one repetitive pulse out of a group of repetitive pulses in the same periodic pulse wave.

Spectrum analyzers are known in which a modulated radio frequency carrier is detected to form a periodic wave (such as a periodic pulse wave) whose frequency components are analyzed and measured. In cases where the periodic input wave may be a group or train of pulses repeated periodically, the indication afforded will not represent an analysis of any one cyclically repeated pulse of the group, but will represent a composite for the entire group of cyclically repeated pulses.

The present invention is particularly concerned with providing special apparatus for selecting any one or any small group of pulses from a repetitive multi-pulse wave form for frequency analysis. In brief, in a preferred form the present invention provides selector apparatus which may be interposed between the mixer and intermediate frequency stages of a conventional spectrum analyzer, although it is not so limited. This apparatus responds to the group-pulse modulated intermediate frequency signal of the conventional spectrum analyzer system, which signal is also fed to a type of switching apparatus designated as a crystal modulator or crystal diode switch apparatus which is normally biased in an "off" or non-conductive condition, which will not permit the input signal to pass to its output, which is supplied to the I.F., detector and display portions of the conventional analyzer. Simultaneously the selector apparatus amplifies the modulated intermediate frequency signal, detects it to obtain the video information in tis waveform in the form of the group of pulses cyclically repeated, and feeds the detected video signal to the video circuits of the selector, which supply the group of pulses to a monitor on which all pulses of the group may be displayed by means of a sweep initiated by the first pulse of the group. The selector also generates a gate pulse signal which is manually adjustable as to duration and position. This gate signal is fed to the crystal modulator diode switch to control the transfer of signal to the analyzer display, and is coincident in time with an intensifier pulse signal applied to the monitor to show which pulse is being passed by the crystal modulator. As the intensifier pulse varies in duration and position, it determines the corresponding portions of the input signal which pass to the analyzer display means. In this way only the pulse or pulses enveloped by the intensifier pulse are fed to the spectrum analyzer, which will accept this information and present the desired frequency spectrum of that pulse signal.

The present invention is particularly concerned with circuits and apparatus which can respond substantially instantaneously to the occurrence of any selected pulse of the input wave, to derive the necessary gating and control signals so that any predetermined time duration of gate can be produced following the commencement of the first pulse. In this way the gating signal may be caused to envelope any one or more pulses existing during the period of the gate.

Other aspects of the present invention concern the specific detailed circuits used in and the overall system for producing the foregoing results. These and other objects and advantages of the present invention will become more fully apparent by consideration of the following description of a preferred embodiment thereof, taken in conjunction with the appended drawings, in which—

Figure 1 is a schematic block diagram of a system embodying the invention;

Figures 2A and 2B form a schematic circuit diagram of certain portions of the system of Figure 1;

Figure 3 is a set of idealized wave form diagrams of the system of Figure 1, in analyzing the first of a group of pulses;

Figure 4 is a diagram of the monitor display corresponding to Figure 3;

Figure 5 is a similar set of idealized wave form diagrams of the system of Figure 1, in analyzing others of the group of pulses; and Figure 6 is a similar monitor display corresponding to Figure 5.

Figure 1:
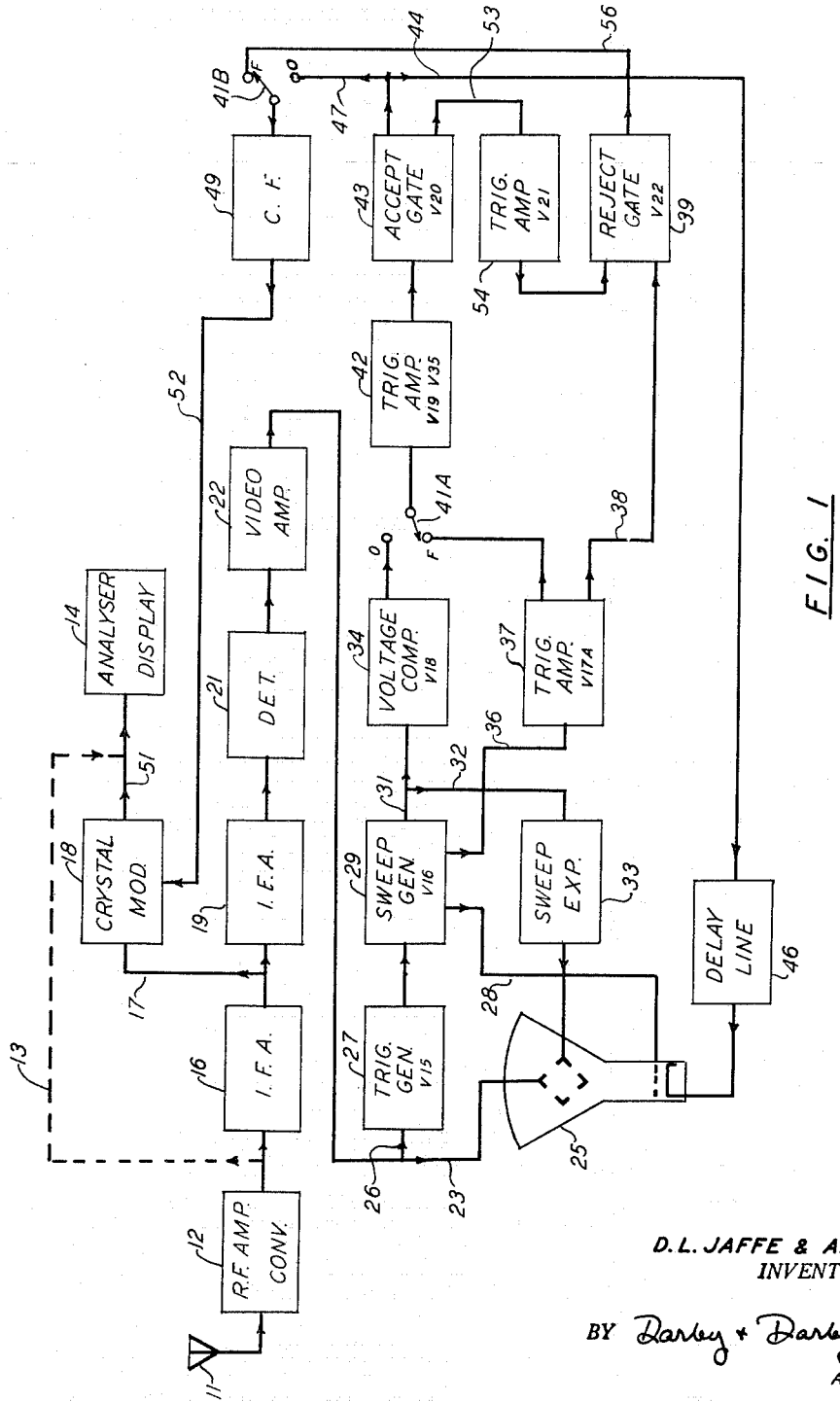

Figure 1 shows a general schematic diagram in block form of the present invention as embodied in a complete spectrum analyzer system. The signal to be analyzed is illustratively assumed to be a radio-frequency carrier wave modulated by a repetitive multi-pulse wave, and the frequency spectrum of a selected pulse of that multi-pulse wave is to be indicated. This modulated carrier wave is received on an antenna 11 or otherwise supplied to a radio-frequency amplifier and converter (or oscillator and mixer) arrangement 12 of any conventional design adapted to convert the received carrier to a correspondingly modulated intermediate frequency wave.

In the conventional spectrum analyzer this intermediate frequency output is supplied by a lead shown in dash lines at 13 to the analyzer and display apparatus 14 forming the remainder of the spectrum analyzer. The present invention is particularly concerned with the provision of additional apparatus forming a multi-pulse spectrum selector which is interposed between the converter 12 and the analyzer and display apparatus 14 and is shown in the remainder of Figure 1.

The modulated intermediate frequency output of the converter 12 is supplied to an intermediate frequency amplifier 16. The output of amplifier 16 is supplied by a lead 17 to a crystal diode modulator or switch unit 18, whose output is supplied to the analyzer-display apparatus 14. The unit 18 acts as a switch which blocks the modulated I.F. signal and prevents it from passing to the analyzer 14 except during the period of a positive gating pulse applied to unit 18 in the manner described below.

The output of I.F. amplifier 16 is also supplied to a further intermediate frequency amplifier 19, whose output is detected by a detector 21 to produce the multipulse wave modulation signal at its output, having the wave form shown at A in Figure 3. This multi-pulse wave is amplified in a video amplifier 22 and is supplied over a lead 23 to the vertical deflecting plates of the cathode ray tube 25. The multi-pulse wave A of Figure 3 is also supplied by a lead 26 to a trigger generator 27. This trigger generator 27 is preferably a so-called Schmidt-type pulse generator which responds to each pulse of the input multipulse wave A to provide a corresponding set of constant-amplitude output pulses which can also be represented by A of Figure 3. In this way any variations in the video pulse signal have no effect on subsequent control circuits.

The uniform-amplitude output of the trigger generator 27 is supplied to the sweep generator 29 which is preferably a sweep "phantastron" circuit which responds to the first pulse of the group of pulses produced by trigger generator 27, to produce a sawtooth sweep voltage wave having a substantially linearly declining wave form appearing on its lead 31, as shown at B in Figure 3. The duration of this linearly declining sawtooth waveform is made manually adjustable as desired, so as to be able to just encompass the entire group of pulses A. The sweep generator 29 responds only to the first pulse of the group shown at A (Figure 3) and is completely insensitive to any further signals for the full duration of its sawtooth. This sawtooth wave B is supplied by lead 32 to a sweep expander circuit 33, and thence to the horizontal deflecting means of the cathode ray tube monitor 25. In this way, the monitor displays wave form A, and only wave form A. Expander 33 permits enlargement of any portion of the multi-pulse wave A to view individual narrow pulses thereof, in conventional manner.

Sweep generator 27 also produces an output rectangular pulse coincident with the sweep B, as shown at C in Figure 3. This pulse C is supplied by lead 36 to a trigger amplifier 37 which produces in its output sharp pulses delineating the beginning and the end of the sweep interval. These pulses, shown at D in Figure 3, are supplied over lead 38 to the reject gate generator 39 described more in detail below. At the same time, these same pulses but of opposite polarity, as shown at E in Figure 3, are supplied through lead 40 and switch 41A when in the "F" position, to a trigger amplifier 42.

Switch 41 is a pulse-selector switch. In position "F" it operates to select only the first pulse and to reject all others during the interval of the sweep, and by means of apparatus to be described permits only that first pulse to pass to the analyzer and display circuits. In the "O" or "Other" position, switch 41 permits the apparatus to select any other pulse or pulses occurring during the interval of the sweep B, as will be shown below. The output of trigger amplifier 42 comprises only the first pulse of wave form E, reversed in polarity and hence coincident with the end of sweep B, as shown at F in Figure 1. This pulse F is supplied to an "accept" gate generator 43 which produces an "accept" gating pulse beginning at the time of pulse F and adjustable in width, as from zero to 10 microseconds. The width of this pulse, shown at G in Figure 3, is determined by a Gate Width control. This pulse is supplied over lead 44 to a delay line 46 and thence to the cathode of the cathode ray tube 25 to provide an intensity gate pulse thereon. The delay line 46 delays the pulse G in order that it will be coincident with the R-F gated signal, which is slightly delayed in crystal modulator 18. The pulses of the original input wave A occurring during the interval of the accept gate pulse G will therefore appear intensified on the screen of the cathode ray tube 24, as shown in Figure 4. The output G of the accept gate generator 43 is also differentiated to produce pulses coinciding with its leading and lagging edges, the latter pulses being supplied over lead 53 to a trigger amplifier 54 and thereby to the reject gate generator 39.

The trailing edge pulse coincident with the end of the accept gate pulse G actuates the reject gate generator 39 to begin an output pulse therefrom. The reject gate generator 39 is also supplied with wave form D of Figure 3 and responds to the second "end-of-group" pulse therefrom to terminate its own output pulse, shown at H in Figure 3.

The output H of the reject gate generator 39 is supplied over lead 56 to the switch 41B (ganged with switch 41A) so that in the "F" position of switch 41B the reject gate pulse H is supplied to the cathode follower 47 and to crystal modulator 18 to cut off the output appearing on its lead 51 during the interval of reject gate pulse H.

The crystal modulator is normally biased to be conductive, and hence conducts except for the interval of reject gate pulse H. It therefore conducts for the period of accept gate pulse G, during which the portion of the input corresponding to the intensified portion of the display shown in Figure 4, passes to the analyzer and display circuit 14.

In the "Others" position of switches 41A and 41B, the sawtooth wave B from sweep generator 27 is also supplied to a voltage comparator delay generator circuit 34 which compares the linearly varying sweep wave B with an adjustable voltage under the control of a Gate-Position variable resistor and produces an output gating pulse which commences at a time-position relative to the first input pulse determined by the setting of the Gate Position control. This pulse ends at the termination of the sweep B, as shown at C in Figure 5. This pulse C is supplied to trigger amplifier 42 which converts it into a pulse wave D of Figure 5 which is supplied to the input of accept gate generator 43. The accept gate output is shown at E in Figure 5, and is the same as G of Figure 3, except that the time position of the accept gate pulse is now adjustable by the Gate Position control.

In position "O," the reject gate generator has no effect. The output of accept gate generator 43 serves as an intensifier gate over lead 44, as before. In addition, this accept gate pulse is supplied over lead 47 to switch 41B and thereby to modulator 18. By a third section of switch 41 (not shown) the bias on modulator 18 may be modified to render it normally blocked, and it becomes unblocked under the influence of accept gate pulse E of Figure 5. The display on tube V25 is then as shown in Figure 6.

The RF amplifier and converter 12, intermediate frequency amplifier 16, intermediate frequency amplifier 19, detector 21, and video amplifier 22 as well as sweep expander circuit 33 and delay line 46 may be of any desired conventional types whose details form no part of the present invention and which need not be described here. The crystal modulator 18 is a conventional apparatus commercial known as crystal modulator P–1000 made by General Radio Company. Any desired switching apparatus may be used here.

Figure 2A:
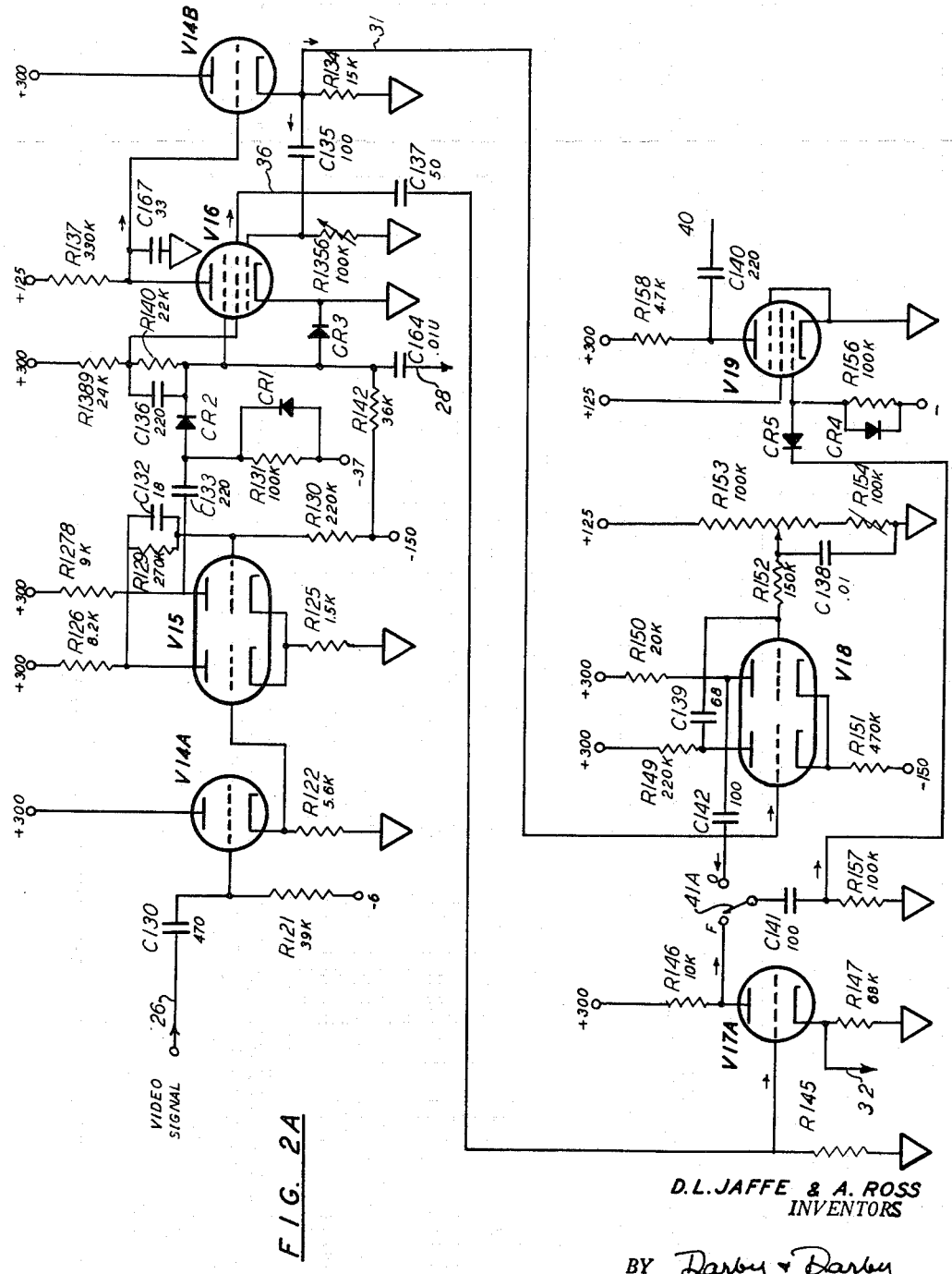
Figure 2B:
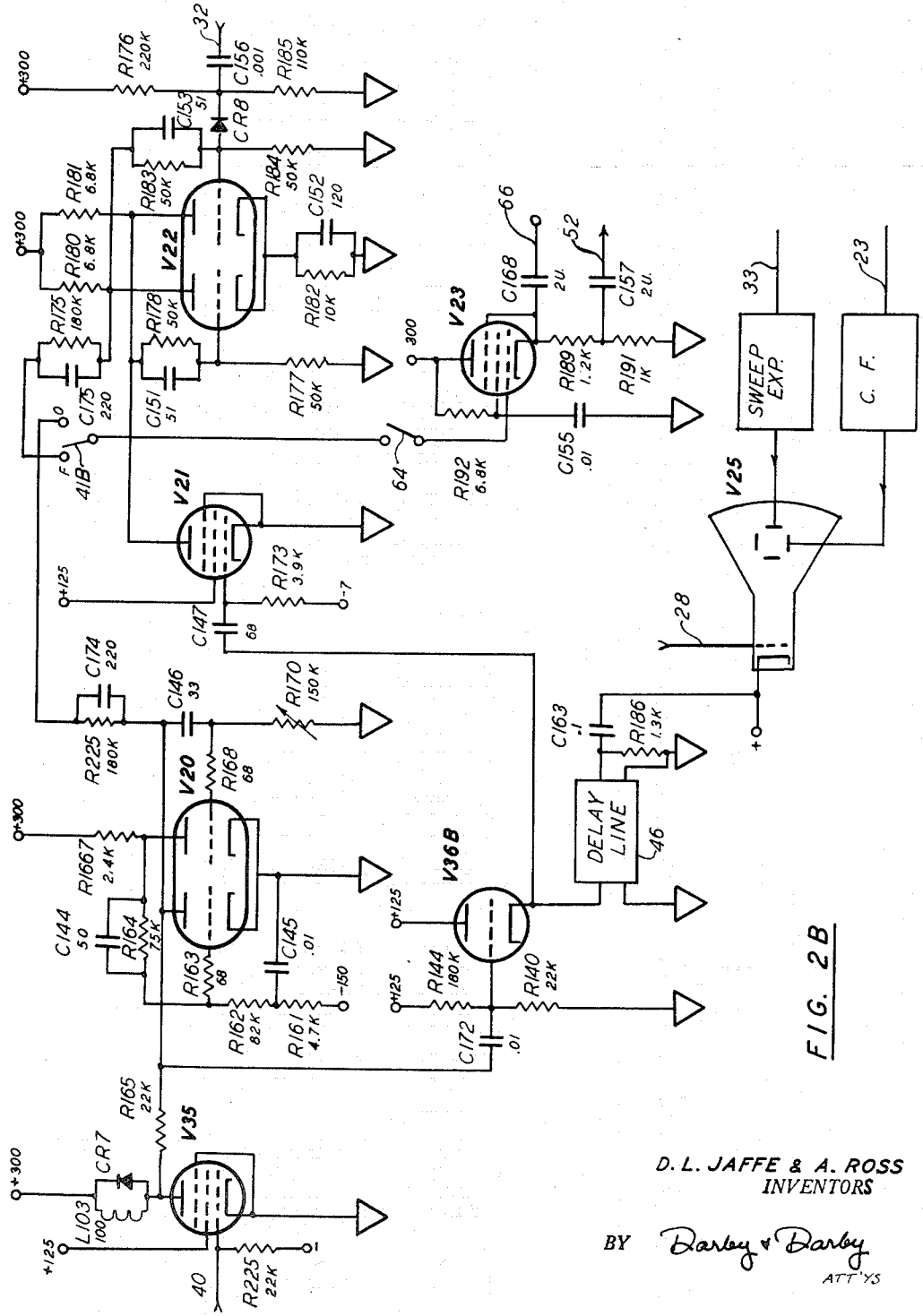

The remaining portions of the present circuit are shown more in detail in Figures 2A and 2B. Referring to these figures, the positive-pulse video signal output from amplifier 22 (A of Figure 3) is supplied over lead 26 through condenser C130 and input resistor R121 to the grid of a cathode follower tube V14A. A suitable source of fixed bias is connected to the lower potential end of R121, indicated here as —6 volts. The cathode of V14A is grounded through resistor R122 and the anode is directly coupled to a source of high positive potential, such as +300 volts. The cathode of V14A is directly coupled to the left grid of the double triode V15 forming the trigger generator 27 proper and thereby supplying a positive pulse wave to that grid. The two cathodes of tube V15 are connected to ground through resistor R125. The anodes are connected to the high positive potential source +300 volts through respective load resistors R126 and R1278. The left anode is also connected to the right grid through parallel RC circuit C132—R129. The right grid is connected through resistor R130 to a high value negative source, such as —150 volts.

Tube V15 is essentially a monostable pulse generator. The left section is normally cut off in the absence of pulses supplied to it from tube V14A. In this condition the left anode will have full voltage, such as +300 volts. R129 and R130 then form a voltage divider to make the right grid normally positive, such as +33 volts, and current flows through the right section of V15 and R125, maintaining the cathode at +32 volts, sufficient to keep the left section cut off and the right section full on.

A positive pulse from wave A supplied to the left section grid starts it conducting, thereby lowering the potential of its anode. Since the voltage across R129 is maintained temporarily by condenser C132, the right grid immediately drops to a value below the volt-drop across R125, which cuts off the right section. This tends to reduce the potential of the cathode and to reduce the bias provided by R125 on the left grid, thereby immediately and sharply driving the left anode to a low potential such as of the order of +80 volts. This action takes place in a very brief time interval of the order of 1 microsecond or less during which the right section is cut off and the right anode rises in potential substantially to the full value of the +300 volt supply. The result is a very sharp-rise, uniform-amplitude positive pulse appearing on the right anode. This pulse continues so long as the input pulse from V14A remains applied to the left grid. As soon as the input pulse terminates the negative bias produced by R125 on the left grid starts to cut off the left section and the action reverses, the consequent increase in potential of the left anode being supplied to the right grid so as to start current flow in the right section, so that the tube V15 returns sharply to its original quiescent condition.

In this way a pulse wave is produced on the right anode corresponding to wave A of Figure 3 and having a sharp rise and fall and of a duration equal to the duration of the input or initiating pulse plus a fixed minimum time interval, of the order of 1 microsecond or less.

This pulse is supplied through condenser C133 to a rectifier CR" which serves to clip off the first portion of the pulse, such as the first 15 volts, to yield a constant-amplitude output. Any tendency of this pulse to include any negative overshoot is overcome by R131 connected to a source of negative bias such as −37 volts and shunted by a diode CR1. The trigger generator output pulse, clipped by CR2, is supplied to the suppressor grid of the sweep phantastron pentode V16, and also through RC circuit C136, R140 to the screen grid of tube V16, and also through condenser C164 to lead 28 coupled to the control grid of the cathode ray tube V25 shown in Figure 2B. This last connection 28 provides blanking of the cathode ray tube V25 except during the input pulses.

The sweep circuit formed by tubes V16 and V14B is the well known "phantastron" circuit and provides a sweep pulse B commencing with the leading edge of the first initiating pulse A and having a duration determined by the "Group Length" control resistor R1356 connected to its control grid. This sweep pulse is independent of later pulses of the group pulse wave A. It is initially of a high positive value such as +125 volts and declines linearly to substantially zero, following which it rises abruptly to its original value of +125 volts. This sweep pulse B is supplied over lead 31 to a voltage comparator delay generator 34 formed by double triode tube V18. The left grid of V18 is supplied with the sweep voltage B from lead 31. The right grid of V18 is supplied with an adjustable bias provided by a voltage divider R153, R154. The cathodes of V18 are connected together through a cathode resistor R151 to a high negative potential such as −150 volts. The anodes are connected to a high positive potential +300 volts through respective load resistors R149 and R150. The left anode is coupled to the right grid through condenser C139.

By means of this circuit a potential is produced on the right anode in the form of a pulse whose leading edge occurs at a time position determined by the setting of the potentiometer R153 (known as the "Gate Positioning" control), the pulse continuing for the remainder of the sweep pulse B. This pulse output from V18 (shown at C in Figure 5) is supplied over condenser C142 to the "O" terminal of switch 41A. The "F" terminal of switch 41A is supplied from the output of trigger amplifier V17A which in turn is supplied from the output of sweep generator tube V16 from lead 36 by way of a differentiating circuit formed by C137 and R145.

The output of V16 supplied by this lead 36 is a rectangular pulse (C, Figure 3) coincident with the sweep pulse B. C137 and R145 differentiate this rectangular pulse to produce a positive pulse corresponding to its leading edge and a negative pulse corresponding to its trailing edge. The movable arm of switch 41A is coupled through condenser C141 and resistor R157 to a diode rectifier CR5 which passes only negative pulses supplied thereto. Accordingly only negative pulses either from V17A or V18 are supplied to the trigger amplifier V19, shown at 42 in Figure 1, which produces a positive pulse (end-of-group pulse) corresponding to termination of the sweep pulse B. This end-of-group pulse appears at the anode of V19 and is supplied through amplifier V35 of Figure 2B to the accept gate generator V20. V35 also has a pulse-sharpening circuit in its anode connection formed by inductance L103 in parallel with a diode rectifier CR7. The sharp negative pulse appearing in the anode of V35 is supplied over resistor R165, condenser C146 and resistor R168 to the right grid of the accept gate generator triode V20. V20 has its two cathodes connected together and to ground. Its right anode is connected to a high positive source such as +300 volts through R1667. The left anode is connected to R165 and C146. The right anode is also connected to the left grid through a parallel RC network C144, R164 and a resistor R163. The junction of R164 and R163 is connected to the negative potential source such as −150 volts through R162 and R161, and their junction is connected to ground for alternating currents through condenser C145.

The right section of V20 is normally conductive while the left section is normally non-conductive. The appearance of the negative trigger pulse at the anode of V35 causes a momentary drop in potential to be applied to the right grid of V20 by providing a discharge path for normally charged condenser C146 through R165, left section of tube V20, and adjustable resistor R170. This causes the potential of the right anode of V20 to rise. This increased potential on the right anode of V20 is supplied to its left grid through the parallel RC circuit C144, R164 and the resistor R163. In this way the increase in potential of the right anode of V20 causes the left grid of V20 to increase its potential, so that the left section of V20 draws current, reducing the potential of its anode. The circuit arrangement is such that after a predetermined time interval determined primarily by the time constant circuit C146 and the Gate Width control R170 the tube V20 restores itself to its original condition, thereby producing on its left anode a single negative rectangular pulse 62 of adjustable duration. R170 may for example vary the duration of the pulse on the right anode of V20 to be from substantially zero to 10 microseconds.

This rectangular accept gate pulse is fed through parallel RC circuit R225—C174 to the "O" terminal of section 41B of switch 41. It will be understood that section 41B is ganged with section 41A shown in Figure 2A.

When the switch 41B is in the right hand or "O" position, the accept gate pulse is supplied through switch 64 to a cathode follower V23 whose output passes by lead 52 to the crystal modulator 18 shown in Figure 1. Switch 64 may be termed the external gate switch. When it is open, an external gate pulse supply may be coupled to the modulator 18 by a connection at 66, without relying upon tube V23.

The same rectangular accept gate pulse is also supplied to a cathode follower tube V36B and thereby to the trigger amplifier tube V21 through a differentiating network C147—R173 which provides sharp negative and positive pulses 63 coincident with the leading and trailing edges of the accept gate pulse. V21 responds only to positive pulses and hence responds to its positive pulse input which is coincident in time with the termination of accept gate pulse. V21 thereby produces a negative pulse in its output, which is supplied to the left grid of reject gate generator double-triode tube V22 through parallel RC circuit C151—R178. The two cathodes of V22 are connected to ground through RC circuit R182—C152. Their anodes are connected to the positive source, such as +300 volts through respective load resistors R180, R181.

The reject gate generator V22 is essentially a double-input "flip-flop" circuit. The right anode is connected to the left grid through R178—C151. The left anode is connected to the right grid through a similar parallel RC circuit R183—C153. Resistors R177 and R184 from the respective grids to ground provide proper biases for the two sections of V22, so that the left section is normally conductive and the right section is normally non-conductive in the absence of input pulses. A negative input pulse applied to the left grid from V21 causes the left section to turn off and the right section to turn on.

The right grid of V22 is supplied with a negative and positive pulse wave from trigger amplifier 37 (V17A) through lead 32 and rectifier CR8 which blocks the positive pulse and passes only the negative pulse. It will be understood that this negative pulse is coincident with the end of the sweep. It serves to restore the tube V22 to its original condition. Therefore the positive pulse derived from the output of the reject gate generator V22 is initiated from V21 at a time corresponding to a setting of the Gate Position control R170, and terminates under the control of V17A at the instant of the termination of the sweep 60. This positive pulse 68 is supplied through C175 and R175 to the "F" terminal of switch 41B.

The general operation of the system will now be described. This apparatus is particularly applicable to situations where the modulation on the input radio frequency wave is a group of pulses having a specified group length (measured in time) repeated periodically and cyclically. The present apparatus permits selection of any one of the group of pulses, either the first or any other, for spectrum analysis.

It is simpler to consider first the manner in which the apparatus serves to select any one or more of the group of pulses other than the first, and it will therefore be first assumed that the pulse selector switch 41 is in the "O" or "Others" position. The wave form of the initiating pulse group as indicated at A in Figure 5 may contain any number of initial pulses. These pulses are derived from the video amplifier 22 and are supplied to the trigger generator 27. Its function is essentially that of wave shaping, so as to produce respectively corresponding pulses with a predetermined constant wave form despite any variations in wave form of the initiating pulses. These reshaped pulses are supplied to the sweep generator 29. The first of these pulses serves to trigger off the sweep, which is thereafter rendered completely independent of the succeeding pulses in the group for the duration of the sweep pulse itself. As already indicated, this duration is under the control of the operator by adjustment of Group Length control R136. By way of example, the group length may be made adjustable from 10 to 200 microseconds.

The sweep pulse produced by V16 and V14B and derived from the cathode of V14B is indicated at B in Figure 5. In the example given, this sweep pulse will have a duration of from 10 to 200 microseconds. Simultaneously there is generated a rectangular pulse derived from the screen grid of V16 which is fed to the control grid of the cathode ray tube V25 by lead 28. It serves to keep the beam blanked off except during the interval of the sweep, so that only video pulses occurring during the sweep pulse will be viewed on the screen of the cathode ray tube. This blanking pulse is shown in C in Figure 3. The sweep pulse B is supplied to the delay generator V18 which produces on its right anode a rectangular pulse beginning at a selectable position starting anywhere along the sweep pulse B and ending concurrently with the sweep pulse B. The length of this pulse (shown at C in Figure 5) is adjusted by the Gate Position control R153. This accept gate pulse is differentiated by C142, C141, R157 to produce a negative pulse at its beginning and a positive pulse at its ending. This positive pulse is suppressed by CR5 so that at the grid of trigger amplifier V19 there is left only a negative pulse corresponding to the beginning of pulse C. This is shown at D in Figure 5. This pulse D is amplified in V19 and V35 and is supplied to the accept gate generator V20.

Accept gate generator V20 is a monostable oscillator which responds to the input pulse to produce an accept gate pulse of duration independent of its input and determined solely by the setting of the Gate Width control R170. By way of example this Gate Width control R170 may provide an output pulse from accept gate generator V20 having a duration of from substantially zero to 10 microseconds. This accept gate pulse is shown at E in Figure 5 and is supplied by way of a cathode follower V36B and delay line 46 to the cathode of the cathode ray tube V25 and serves as an intensifier pulse to enhance the brightness of the image appearing on the screen of the cathode ray tube V25 during the interval of this pulse E. At the same time this pulse E is supplied to the modulator 18 and converts it from its normally blocked condition to an open condition in which it passes the intermediate frequency wave supplied to it over lead 17 of Figure 1.

Thus it will be seen that there is displayed on the face of the cathode ray tube all video input pulses during the selected duration of the sweep, corresponding to the duration of the blanking pulse C of Figure 3. At the same time a portion of that display coincident with the pulse E of Figure 5 appears intensified. Accordingly, in use the group length control is adjusted to display the entire group of pulses desired, cutting off all other signal or noise pulses appearing outside of the duration interval of the sweep B or blanking pulse C. The gate position control is then adjusted so that the intensified pulse shown on the cathode ray tube face is the one which it is desired to analyze. If the intensified portion of the cathode ray tube display includes more than one pulse, then the gate width control may be adjusted to intensify only the one or more desired pulses. When this is done the accept gate pulse has exactly the time position and the time duration of the pulse to be examined, and it serves to unblock the modulator for the proper interval to allow only the carrier bearing that pulse to pass to the spectrum analyzer.

It will be understood that the foregoing has described what occurs in but one cycle or repetition of the group of pulses. Since this group of pulses is periodically repeated, the spectrum analyzer will receive a repetitive pulse wave extracted from the complete group shown in A of Figure 3.

Where it is desired to select a first pulse of the group A the pulse selector switch 41 is thrown to the "F" or "First" position, which cuts out the voltage comparator delay generator V18. The operation is that indicated in Figure 3. The blanking pulse output from V16, shown at C, is differentiated by C137 and R145 producing a positive pulse coincident with the commencement of the sweep B and a negative pulse coincident with the termination of the sweep at the grid of trigger amplifier V17A and this is amplified and reversed in polarity to appear at the anode of V17A as shown in D of Figure 3. This wave D has its positive pulse blocked in CR5 and the negative pulse is applied to the grid of trigger amplifier V19 in lieu of the corresponding wave from voltage comparator delay generator V18 in the "Others" position. Accordingly the accept gate generator V20 is now actuated by a pulse coincident with the start of the sweep instead of at a time determined by the setting of the Gate Position control R153. This pulse causes the accept gate generator to produce an accept gate pulse G of 0 to 10 microsecond duration and commencing with the beginning of the sweep pulse B. This pulse G as before provides the intensification pulse applied to the cathode of the cathode ray tube. The pulse N is also differentiated at C147—R173 and applied to the grid of trigger amplifier V12, which is normally cut off and responds only to positive pulses at its input. Accordingly in its output there appears a pulse coincident with the termination of the accept gate pulse G. This pulse is supplied to the input of the reject gate generator V22 to which is also supplied a pulse from trigger amplifier V17A. As shown at D, the input to V17A has an initial positive pulse coincident with the commencement of the sweep and a final negative pulse coincident with the termination of the sweep. At the input to V22 the positive pulse is suppressed leaving only the negative pulse coincident with termination of the sweep. Reject gate generator V22 supplies an output rectangular pulse which commences at a time coincident with the termination of the accept gate pulse and terminating at the end of the sweep pulse. This is shown at H in Figure 3. This pulse H is supplied to the modulator which is blocked by it except for the period of zero to 10 microseconds coincident with the accept gate pulse G and preceding the modulator blocking pulse H.

In operation the apparatus is utilized in the same manner as before. The group length control is adjusted to encompass and to display on the face of the cathode ray tube the entire group of pulses under consideration. In this instance the gate position control has no effect, but the intensification pulse starts at the start of the sweep. It is adjustable in duration by the gate width control, and this is set to encompass only the desired first pulse and to block off all subsequent pulses. The sweep expander 33 allows close inspection of a pulse in a closely spaced group of pulses. The system then automatically passes to the spectrum analyzer only the portion of the intermediate frequency wave coincident with the duration of the accept gate pulse G.

Accordingly the present apparatus has provided a system and apparatus which can select any one or more desired pulses from a repetitively repeated group of pulse waves, so that any one pulse wave form of such a repetitive group can be separately analyzed, regardless of whether that pulse may be the first pulse of the group or an intermediate or last pulse of the group.

It will be understood that, where desired, the output of the video amplifier 22 may be supplied to the crystal diode modulator or switch 18. Also, the present system is not limited to R-F modulated signals, but may respond to any source of group pulse wave such as A of Figure 3 or 5.

The foregoing description is to be taken as illustrative only, since many different embodiments of the invent may be readily devised, the invention being defined solely by the appended claims.

What is claimed is:

1. In a selector apparatus for selecting one repetitive pulse wave from an input repetitive group pulse wave, the combination comprising means responsive to only the first pulse of said group for generating a periodic wave having a sawtooth portion, means for adjusting the duration of the sawtooth portions of said latter wave, means for producing a periodic group-length rectangular pulse wave having pulses coincident in time with said sawtooth wave portions, cathode ray tube display means responsive to said group pulse wave and to said periodic sawtooth wave for displaying the wave form of said group pulse wave, means responsive to said periodic group-length rectangular pulse wave for blanking said display except during said sawtooth-coincident pulses; means for generating a repetitive wave having accept gate trigger pulses coincident with the start of each of said sawtooth portions, means responsive to said latter trigger pulses for generating accept gate rectangular pulses commencing coincidently with said trigger pulses and of adjustable duration, means responsive to said accept gate rectangular pulses for intensifying said display only for the duration of said accept gate rectangular pulses, means responsive to termination of each of said accept gate pulses for generating a reject gate trigger pulse, means for generating end-of-group trigger pulses coincident with the termination of each of said sawtooth wave portions, means responsive to said reject gate trigger pulses and to said end-of-group trigger pulses for producing reject gate rectangular pulses starting coincidently with said reject gate trigger pulses and terminating coincidently with said end-of-group trigger pulses, and means for deriving from said group pulse wave only those pulses non-coincident with said reject gate rectangular pulses, whereby said last derived pulses are solely those coincident with said adjustable accept gate rectangular pulses.

2. In a selector apparatus for selecting one repetitive pulse wave from an input repetitive group pulse wave, the combination comprising means responsive to only the first pulse of said group for generating a periodic wave having a sawtooth portion, means for adjusting the duration of the sawtooth portions of said latter wave, means for producing a periodic group-length rectangular pulse wave having pulses coincident in time with said sawtooth wave portions, cathode ray tube display means responsive to said group pulse wave and to said periodic sawtooth wave for displaying the wave form of said group pulse wave, means responsive to said periodic group-length rectangular pulse wave for blanking said display except during said sawtooth-coincident pulses; means for generating a repetitive wave having accept gate trigger pulses coincident with the start of each of said sowtooth portions, means responsive to said latter trigger pulses for generating accept gate rectangular pulses commencing coincidently with said trigger pulses and of adjustable duration, means responsive to termination of each of said accept-gate pulses for generating a reject-gate trigger pulse, means for generating end-of-group trigger pulses coincident with the termination of each of said sawtooth wave portions, means responsive to said reject gate trigger pulses to said end-of-group trigger pulses for producing reject gate rectangular pulses starting coincidently with said reject gate trigger pulses and terminating coincidently with said end-of-group trigger pulses, and means for deriving from said group pulse wave only those pulses non-coincident with said reject gate rectangular pulses, whereby said last derived pulses are solely those coincident with said adjustable accept gate rectangular pulses.

3. In a selector apparatus for selecting one repetitive pulse wave from an input repetitive group pulse wave, the combination comprising means responsive to only the first pulse of said group for generating a periodic wave having a sawtooth portion, means for adjusting the duration of the sawtooth portions of said latter wave, means for producing a periodic group-length rectangular pulse wave having pulses coincident in time with said sawtooth wave portions, cathode ray tube display means responsive to said group pulse wave and to said periodic sawtooth wave for displaying the wave form of said group pulse wave, means for generating a repetitive wave having accept gate trigger pulses coincident with the start of each of said sawtooth portions, means responsive to said latter trigger pulses for generating accept gate rectangular pulses commencing coincidently with said trigger pulses and of adjustable duration, means responsive to termination of each of said accept gate pulses for generating a reject gate trigger pulse, means for generating end-of-group trigger pulses coincident with the termination of each of said sawtooth wave portions, means responsive to said reject gate trigger pulses and to said end-of-group trigger pulses for producing reject gate rectangular pulses starting coincidently with said reject gate trigger pulses and terminating coincidently with said end-of-group trigger pulses, and means for deriving from said group pulse wave only those pulses non-coincident with said reject gate rectangular pulses, whereby said last derived pulses are solely those coincident with said adjustable accept gate rectangular pulses.

4. In a selector apparatus for selecting one repetitive pulse wave from an input repetitive group pulse wave, the combination comprising means responsive to only the first pulse of said group for generating a periodic wave having a sawtooth portion, means for adjusting the duration of the sawtooth portions of said latter wave, means for producing a periodic group-length rectangular pulse wave having pulses coincident in time with said sawtooth wave portions, cathode ray tube display means responsive to said group pulse wave and to said periodic sawtooth wave for displaying the wave form of said group pulse wave, means for generating a repetitive wave having accept gate trigger pulses coincident with the start of each of said sawtooth portions, means responsive to said latter trigger pulses for generating accept gate rectangular pulses commencing coincidently with said trigger pulses and of adjustable duration, means responsive to said accept gate rectangular pulses for intensifying said display only for the duration of said accept gate rectangular pulses, means responsive to termination of each of said accept gate pulses for generating a reject gate trigger pulse, means for generating end-of-group trigger pulses coincident with the termination of each of said sawtooth wave portions, means responsive to said reject gate trigger pulses and to said end-of-group trigger pulses for producing reject gate rectangular pulses starting coincidently with said reject gate trigger pulses and terminating coincidently with said end-of-group trigger pulses, and means for deriving from said group pulse wave only those pulses non-coincident with said reject gate rectangular pulses, whereby said last derived pulses are solely those coincident with said adjustable accept gate rectangular pulses.

5. In a selector apparatus for selecting one repetitive pulse wave from an input repetitive group pulse wave, the combination comprising means responsive to only the first pulse of said group for generating a periodic wave having a sawtooth portion, means for adjusting the duration of the sawtooth portions of said latter wave, means for generating a repetitive wave having accept gate trigger pulses coincident with the start of each of said sawtooth portions, means responsive to said latter trigger pulses for generating accept gate rectangular pulses commencing coincidently with said trigger pulses and of adjustable duration, means responsive to termination of each of said accept gate pulses for generating a reject gate trigger pulse, means for generating end-of-group trigger pulses, coincident with the termination of each of said sawtooth wave portions, means responsive to said reject gate trigger pulses and to said end-of-group trigger pulses for producing reject gate rectangular pulses starting coincidently with said reject gate trigger pulses and terminating coincidently with said end-of-group trigger pulses, and means for deriving from said group pulse wave only those pulses non-coincident with said reject gate rectangular pulses, whereby said last derived pulses are solely those coincident with said adjustable accept gate rectangular pulses.

6. In a selector apparatus for selecting one repetitive pulse wave from an input repetitive group-pulse wave, the combination comprising means responsive to the first pulse of each of said groups for generating a sweep wave having periodic sawtooth portions, means for generating an accept gate pulse wave having rectangular pulses each commencing coincidently with said sweep sawtooth portions, means for generating a reject gate pulse wave having rectangular pulses each commencing coincidently with the termination of an accept gate rectangular pulse and terminating coincidently with the termination of said sweep sawtooth wave portions, display means responsive to said input group-pulse wave and to said sweep wave for displaying the wave form of said entire group-pulse wave, means for blocking said display means except during said sweep sawtooth portions, an output circuit adapted to be supplied with said input group-pulse wave, and means for preventing said latter supply during said reject gate rectangular pulses, whereby said output circuit is supplied with the portion of said group-pulse wave coincident with said accept gate rectangular pulses, means for intensifying said displayed wave form during said accept gate rectangular pulses to indicate the output supplied portions of said group-pulse wave.

7. In a selector apparatus for selecting one repetitive pulse wave from an input repetitive group-pulse wave, the combination comprising means responsive to the first pulse of each of said groups for generating a sweep wave having periodic sawtooth portions, means for generating an accept gate pulse wave having rectangular pulses each commencing coincidently with said sweep sawtooth portions, means for generating a reject gate pulse wave having rectangular pulses each commencing coincidently with the termination of an accept gate rectangular pulse and terminating coincidently with the termination of said sweep sawtooth wave portions, display means responsive to said input group-pulse wave and to said sweep wave for displaying the wave form of said entire group-pulse wave, an output circuit adapted to be supplied with said input group-pulse wave, means for preventing said latter supply during said reject gate rectangular pulses, whereby said output circuit is supplied with the portion of said group-pulse wave coincident with said accept gate rectangular pulses, and means for intensifying said displayed wave form during said accept gate rectangular pulses to indicate the output supplied portions of said group-pulse wave.

8. In a selector apparatus for selecting one repetitive pulse wave from an input repetitive group-pulse wave, the combination comprising means responsive to the first pulse of each of said groups for generating a sweep wave having periodic sawtooth portions, means for generating an accept gate pulse wave having rectangular pulses each commencing at a selectable instant during said sweep sawtooth portions, means for adjusting the duration of said accept gate rectangular pulses over a predetermined range, display means responsive to said input group-pulse wave and to said sweep wave for displaying the wave form of said entire group-pulse wave, an output circuit adapted to be supplied with said input group-pulse wave and means for preventing said latter supply except during said accept gate rectangular pulses, and means for intensifying said displayed wave form during said accept gate rectangular pulses to indicate the output supplied portions of said group-pulse wave.

9. In a selector apparatus for selecting one repetitive pulse wave from an input repetitive group-pulse wave, the combination comprising means responsive to the first pulse of each of said groups for generating a sweep wave having periodic sawtooth portions, means for generating an accept gate pulse wave having rectangular pulses each commencing at a selectable instant during said sweep sawtooth portions, means for adjusting the duration of said accept gate rectangular pulses over a predetermined range, an output circuit adapted to be supplied with said input group-pulse wave and means for preventing said latter supply except during said accept gate rectangular pulses.

10. In a selector apparatus for selecting one repetitive pulse wave from an input repetitive group-pulse wave, the combination comprising means responsive to the first pulse of each of said groups for generating a sweep wave having periodic sawtooth portions, means for generating an accept gate pulse wave having rectangular pulses each commencing selectively coincidently with commencement of said sweep sawtooth wave portions or at an adjustable instant during said sweep sawtooth wave portions, means for adjusting the duration of said accept gate rectangular pulses over a predetermined range, display means responsive to said input group-pulse wave and to said sweep wave for displaying the wave form of said entire group-pulse wave, means for generating a reject gate pulse wave having rectangular pulses each commencing coincidently with the termination of an accept gate rectangular pulse and terminating coincidently with the termination of said sweep sawtooth wave portions, an output circuit adapted to be supplied with said input group-pulse wave, and means for preventing said latter supply selectively either during the non-coincidence of said accept gate rectangular pulses or during the coincidence of said reject gate rectangular pulses, whereby said output circuit is supplied with the portion of said group-pulse wave coincident with said accept gate rectangular pulses, and means for intensifying said displayed wave form during said accept gate rectangular pulses to indicate the output supplied portions of said group-pulse wave.

11. In a selector apparatus for selecting one repetitive pulse wave from an input repetitive group-pulse wave, the combination comprising means responsive to the first pulse of each of said groups for generating a sweep wave having periodic sawtooth portions, means for generating an accept gate pulse wave having rectangular pulses each commencing selectively coincidently with commencement of said sweep sawtooth wave portions or at an adjustable instant during said sweep sawtooth wave portion, means for adjusting the duration of said accept gate rectangular pulses over a predetermined range, means for generating a reject gate pulse wave having rectangular pulses each commencing coincidently with the termination of an accept gate rectangular pulse and terminating coincidently with the termination of said sweep sawtooth wave portions, an output circuit adapted to be supplied with said input group-pulse wave and means for preventing said latter supply selectively either during the non-coincidence of said accept gate rectangular pulses or during the coincidence of said reject gate rectangular pulses, whereby said output circuit is supplied with the portion of said group-pulse wave coincident with said accept gate rectangular pulses.

12. Selector apparatus for selecting one repetitive radio frequency modulated pulse wave from an input repetitive radio frequency modulated group-pulse wave comprising detector means for converting said radio frequency modulated pulse waves to video pulse waves, means for generating a sweep wave of sawtooth waveform, means for initiating said sweep wave in response to an input video pulse wave, means for preventing the initiation of a further sweep wave during the continuance of the first said sweep wave, means for adjusting the duration of said sweep wave thereby allowing said sweep wave duration to be adjusted to a value less than the period of said repetitive pulse waves and greater than the length of the group-pulse wave to cause sweep waves to be initiated at successive corresponding pulse waves of said group-pulse wave, means for generating an accept gate rectangular pulse at a predetermined adjustable time interval after the initiation of said sweep wave, means for adjusting the duration of said accept gate rectangular pulse, a radio frequency spectrum analyzer circuit normally supplied with said input radio frequency modulated group-pulse wave, means for suppressing said radio frequency modulated group-pulse wave except during said accept gate rectangular pulses, display means responsive to said video pulses and to said sweep wave for displaying the wave-form of the video group-pulse wave, and means for intensifying said displayed wave-form in response to said accept gate rectangular pulse to indicate the portion of said group-pulse wave supplied to said spectrum analyzer circuit.

13. Selector apparatus for selecting one repetitive radio frequency modulated pulse wave from an input repetitive radio frequency modulated group-pulse wave comprising detector means for converting said radio frequency modulated pulse-waves to video pulse waves, means for generating a sweep wave of sawtooth waveform, means for initiating said sweep wave in response to an input video pulse wave, means for preventing the initiation of a further sweep wave during the continuance of the first said sweep wave, means for adjusting the duration of said sweep wave thereby allowing said sweep wave duration to be adjusted to a value less than the period of said repetitive pulse waves and greater than the length of the group pulse wave to cause sweep waves to be initiated at successive corresponding pulse waves of said group pulse wave, means for generating an accept gate rectangular pulse at a predetermined time interval after the initiation of said sweep wave, a radio frequency spectrum analyzer circuit normally supplied with said input radio frequency modulated group-pulse wave, means for suppressing said radio frequency modulated group-pulse wave except during said accept gate rectangular pulses, display means responsive to said video pulses and to said sweep wave for displaying the wave-form of the video group-pulse wave, and means for identifying a portion of said displayed wave form in response to said accept gate rectangular pulse to indicate the portion of said group-pulse wave supplied to said spectrum analyzer circuit.

14. Selector apparatus for selecting one repetitive radio frequency modulated pulse wave from an input repetitive radio frequency modulated group-pulse wave comprising detector means for converting said radio frequency modulated pulse-waves to video pulse waves, means for generating a sweep wave of sawtooth waveform, means for initiating said sweep wave in response to an input video pulse wave, means for preventing the initiation of a further sweep wave during the continuance of the first said sweep wave, said sweep wave duration having a value less than the period of said repetitive pulse waves and greater than the length of the group pulse wave to cause sweep waves to be initiated at successive corresponding pulse waves of said group-pulse wave, means for generating an accept gate rectangular pulse at a predetermined time interval after the initiation of said sweep wave, a radio frequency spectrum analyzer circuit normally supplied with said input radio frequency modulated group-pulse wave, and means for suppressing said radio frequency modulated group-pulse wave except during said accept gate rectangular pulses.

15. Selector apparatus for selecting one repetitive pulse wave from an input repetitive group-pulse wave comprising means for generating a sweep wave of sawtooth waveform, means for initiating said sweep wave in response to an input pulse wave, means for preventing the initiation of a further sweep wave during the continuance of the first said sweep wave, means for adjusting the duration of said sweep wave thereby allowing said sweep wave duration to be adjusted to a value less than the period of said repetitive pulse waves and greater than the length of the group-pulse wave to cause sweep waves to be initiated at successive corresponding pulse waves of said group-pulse wave, means for generating an accept gate rectangular pulse at a predetermined adjustable time interval after the initiation of said sweep wave, means for adjusting the duration of said accept gate rectangular pulse, an output circuit normally supplied with said input group-pulse wave, means for suppressing said group-pulse wave except during said accept gate rectangular pulses, display means responsive to said input group-pulse wave and to said sweep wave for displaying the wave-form of said group-pulse wave, and means for intensifying said displayed wave form in response to said accept gate rectangular pulse to indicate the portion of said group-pulse wave supplied to said output circuit.

16. Selector apparatus for selecting one repetitive pulse wave from an input repetitive group-pulse wave comprising means for generating a sweep wave of sawtooth waveform, means for initiating said sweep wave in response to an input pulse wave, means for preventing the initiation of a further sweep wave during the continuance of the first said sweep wave, said sweep wave duration having a value less than the period of said repetitive pulse waves and greater than the length of the group-pulse wave to cause sweep waves to be initiated at successive corresponding pulse waves of said group-pulse wave, means for generating an accept gate rectangular pulse at a predetermined time interval after the initiation of said sweep wave, an output circuit normally supplied with said input group-pulse wave, and means for suppressing said group-pulse wave except during said accept gate rectangular pulses.

References Cited in the file of this patent

UNITED STATES PATENTS

| | | |
|---|---|---|
| 2,355,363 | Christaldi | Aug. 8, 1944 |
| 2,422,204 | Meacham | June 17, 1947 |
| 2,625,667 | Chance | Jan. 13, 1953 |
| 2,740,069 | Minto | Mar. 27, 1956 |
| 2,758,247 | Johnson | Aug. 7, 1956 |